United States Patent [19]

Bluege

[11] Patent Number: 5,020,880
[45] Date of Patent: Jun. 4, 1991

[54] LOW DISTORTION WINDOW FOR USE WITH HIGH ENERGY LASERS

[75] Inventor: John Bluege, Lake Park, Fla.

[73] Assignee: United Technologies Corporation, Hartford, Conn.

[21] Appl. No.: 492,778

[22] Filed: Mar. 13, 1990

[51] Int. Cl.$^5$ .............................................. G02B 5/00
[52] U.S. Cl. ................................... 350/319; 372/103; 428/408
[58] Field of Search ............... 350/319, 318, 321, 311, 350/317, 610; 372/103, 35; 428/408

[56] References Cited

U.S. PATENT DOCUMENTS

| | | | |
|---|---|---|---|
| 3,894,795 | 7/1975 | Laurens | 372/35 |
| 3,895,313 | 7/1975 | Seitz | 372/103 |

*Primary Examiner*—Scott J. Sugarman
*Assistant Examiner*—Loha Ben
*Attorney, Agent, or Firm*—McCormick, Paulding & Huber

[57] ABSTRACT

A window for use with high energy laser (HEL) systems utilizes a combination of window and cooled mirror technologies. The present window is adapted to receive an elongated focus beam at one or more adjacent diamond plates. The plates are positioned in base members by peripheral edges thereof. Heat generated by the absorption of radiation from the beam is transferred directly to heat exchangers in the base members through the peripheral edges. The geometry of the window ensures that heat transfer is bidirectional. The very short distance the heat must travel results in a very small rise in temperature of the window with a correspondingly small amount of optical distortion.

19 Claims, 2 Drawing Sheets

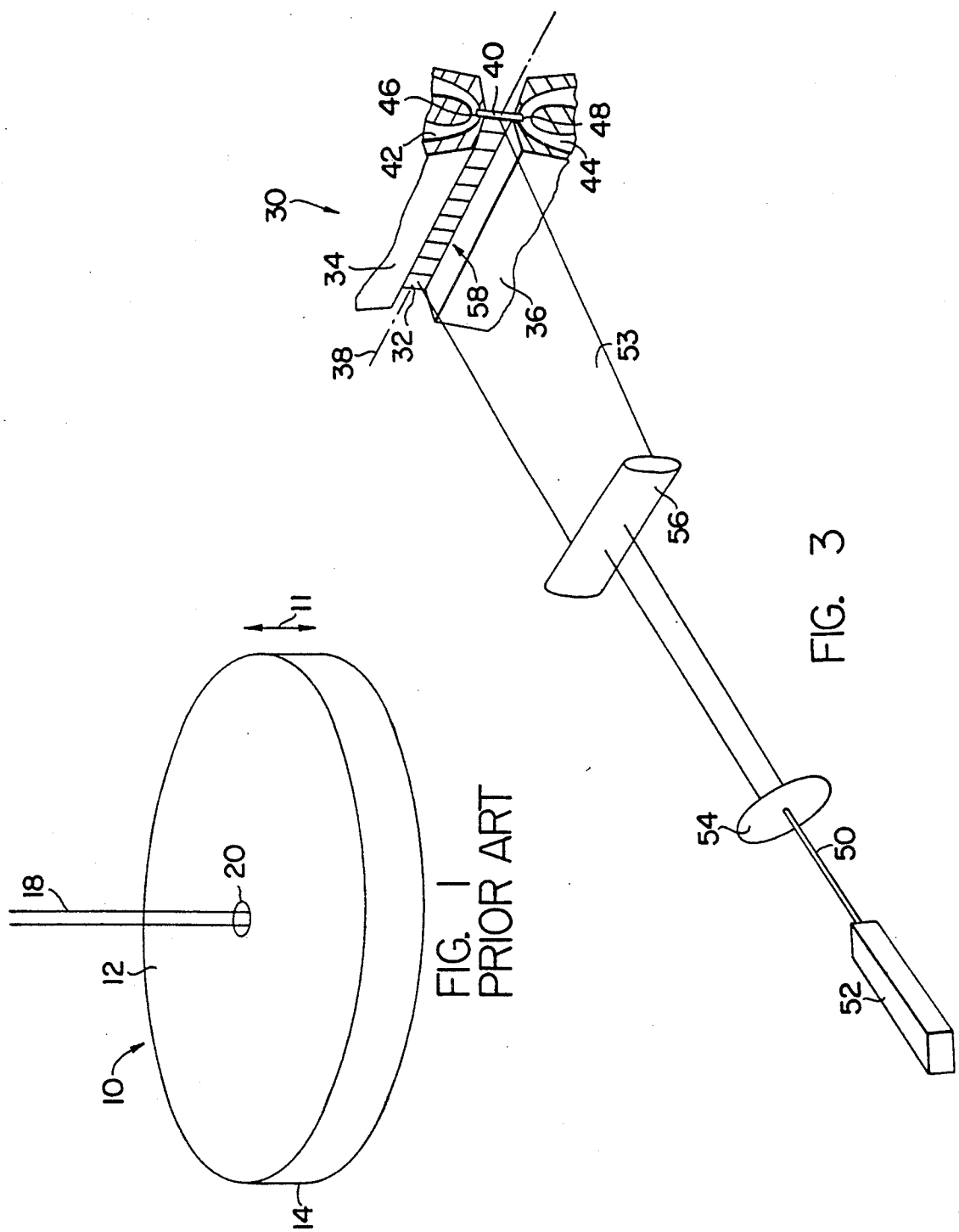

TABLE 1

| Material | Diamond (IIa) | Al$_2$O$_3$ | Silicon |
|---|---|---|---|
| Refractive Index (h) | 2.43 | 1.76 | 3.4 |
| Thermal Cond (x) w/cm/c | 2.0 | 0.46 | 1.56 |
| Absorptivity ($\beta$)/cm ($\lambda$=1-1.5μm) | 1.0 df@$\lambda$=3.8μm est. .001 | .004 avg. | .004 avg. |
| Expansivity ($\alpha$) ppm/c | 1.25 | 5.0 | 2.3 |
| $\delta n/\delta T$ ppm/°C | 9.8 | 12 | 160 |
| Tensile Strength 10$^{10}$ N/m | 1-2 | .04-.07 | .01 |

LOW DISTORTION WINDOW FOR USE WITH HIGH ENERGY LASERS

Optical systems using laser beams having extremely high energies are known in the art. These systems are used in such applications as industrial welding machines and the Strategic Defense Initiative. Most optical systems designed to receive radiation from high energy lasers (HEL) require one or more devices which allow a beam to pass between regions of different gas pressures, as some devices are characterized by regions of high or medium vacuum. The classical solution has been an optical window comprised of silicon dioxide or other material suitably transparent at the wavelengths of interest. However, increasing beam intensities have precluded the use of windows due to high levels of optical distortion.

Aerodynamic windows are generally characterized by an unobstructed passage bounding a low pressure region within a laser and its exterior. A nozzle provides fluid across the passage at flow rates that maintain the pressure differential while simultaneously allowing the laser beam to pass unimpeded. An example of such an aerodynamic window is found in U.S. Pat. No. 4,178,076 and is incorporated herein by reference. These windows are capable of withstanding beams of very high intensities. Unfortunately, aerodynamic windows introduce large amounts of static and dynamic distortion into both the beam and into components acoustically coupled to the window.

It would be advantageous to have an optical window capable of transmitting high power intensity beams without distortion and also capable of maintaining a high gas pressure difference across the window. The present invention is drawn towards such a window.

SUMMARY OF INVENTION

An object of the present invention is to provide an optical window capable of transmitting high intensity laser beams without distortion.

Another object of the present invention is to provide an optical window capable of maintaining a high gas pressure difference thereacross.

According to the present invention, a window for transmitting radiation distributed over an axis includes a transmission element having a width, a length and outer peripheral surfaces, the transmission element for receiving and transmitting the radiation with a portion of the energy thereof absorbed by the transmission element. The window has first and second base members adapted to receive the transmission element along opposed surfaces of the peripheral surfaces which are parallel to the axis and extending therealong. The first and second base members locate the transmission element such that the axis is centrally positioned along the length of the transmission element and dissipates said absorbed energy portion. The transmission element width and length have a ratio such that substantially all of the absorbed energy portion is transferred to the first and second base members.

BRIEF DESCRIPTION OF THE DRAWINGS

FIG. 1 is a simplified illustration of a known window for use with high energy lasers.

FIG. 3 is a simplified illustration, partially in section and partially in perspective of a window provided according to the present invention.

DESCRIPTION OF THE PREFERRED EMBODIMENT

Figures 2, 4:
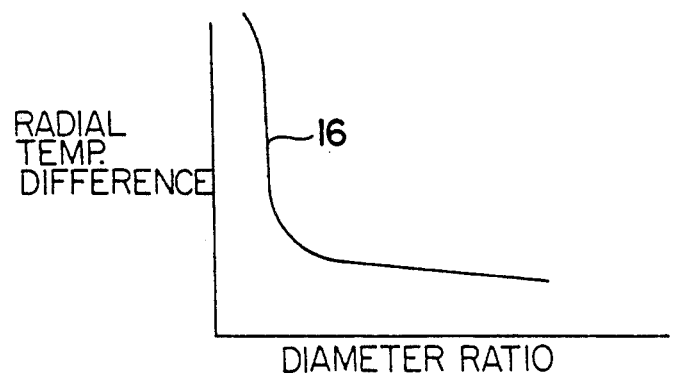
FIG. 2 is a diagrammatic illustration showing the effect on window temperature of reducing the diameter ratio between a high energy laser beam and a circular window.
FIG. 4 is a table of alternative materials parameters for the window of FIG. 3.

Due to advances in the requirements of high energy laser (HEL) systems optical windows are again the primary candidates for the interfaces needed for high energy beams that require a gas pressure differential or which provide a means to deflect a portion of the beam or other beam from the HEL beam path. Unfortunately, no uncooled window material can withstand the full load of a high energy laser (HEL) beam for more than a short period of time before becoming unacceptably distorted or risking catastrophic failure due to the limited thermal conductivity and heat capacity of even the best window materials. In addition, current window materials are very susceptible to defect and contamination induced thermal stress which, under continuous or repetitive pulse loading, will lead to complete destruction of the component. Even when designed to provide for the removal of heat from its perimeter, known circular windows are limited in the peak power that can be transmitted through the window.

Referring first to FIGS. 1 and 2, there is shown a known window 10 comprising diamond, silicon dioxide or other equivalent material. The window 10 is characterized by cylindrical geometry, having a finite thickness 11 with window surface 12 bounded by circular perimeter surface 14. FIG. 2 is a diagram illustrating the radial temperature distribution (Curve 16) produced thereacross by a CW high energy laser beam 18 centered about point 20.

As the beam passes through the window it absorbs energy from the beam. The flow of energy imparted to window from an incident beam of radiation is a function of several parameters, including the thickness of the window and its absorptivity at the wavelength of the incident radiation. An increase in temperature is produced which is a function of the material properties of the window and its mount, as well as their respective geometries. The parameters of the beam also impact on the increase in window temperature. This rise in temperature is undesirable, since it causes thermal growth of the window and produces a change in the index of refraction and physical thickness of the window. The beam induced rise in window temperature produces optical distortion and even distruction thereof. As shown by curve 16 in FIG. 2, as the ratio of beam to window diameter is reduced, the temperature difference between a location in the window at the beam radius and the window perimeter increases without limit. Increasing the width of the beam will produce temperature gradients of a smaller magnitude but require a larger window diameter to fully transmit the beam without vignetting.

Heat is most effectively transferred from windows by means of heat exchangers located at the outside perimeter. The temperature rise in the element is ultimately a function of the distance the heat must travel to exit to the heat exchanger. Known non-aerodynamic windows have a circular geometry, since they typically receive a beam whose power density cross section displays radial symmetry. These windows are the easiest to fabricate and the axially symmetric geometry, even heat flow and temperature distributions are thought to minimize thermo-optic distortion. However this geometry yields the minimum perimeter surface for a given area as well as the maximum conduction length, and therefore minimizes the heat transferred from the window by conduction.

The energy flow and resultant heat transfer can be seen by reference to FIG. 2. The radial variation in temperature for a purely edge cooled cylinder is given by the well known heat transfer equation (as shown in Carlslaw and Jaeger, Conduction of Heat in Solids, 2nd Edition, Oxford Science Publications, Claredon Press, 1988.):

$$T_a - T_b = \dot{Q}(\ln[b/a])/[2\pi Kt] \quad (1)$$

where $\dot{Q}$ is the heat deposited uniformly along the axis of the cylinder per unit time, a is the beam radius, b is the outer radius of the cylinder, K is the thermal conductivity, and t is the cylinder thickness along the axis. Generally, for a window, the diameter, b, is significantly larger than the thickness, t. For the case of an idealized, 0.2 cm diameter, flat topped megawatt (1 Mw) beam which deposits 10 kilowatts (kw) along the window's cylindrical axis due to absorption, the temperature rise between the edge of the beam and the perimeter of a 1 cm diameter by 0.1 cm window with conductivity of 20 w/cm/°C. (the highest value known) will be close to 1300° C. No known material could handle this environment without inducing significant beam distortion, assuming the window can survive. Note that for a properly designed window, increasing the beam radius is of no help because the window diameter must be increased by the same ratio. As equation 1 shows, the temperature drop will remain the same. In addition, when the beam intensity is on the order of 100 Mw/cm$^2$, complex beam path conditioning would be required to prevent aerosol-atmosphere breakdown which would degrade the beam quality even further.

Therefore, as HEL power increases, element damage or thermally induced distortion is almost certain with windows of this geometry. Those skilled in the art will note that increasing the area of peripheral surface 14 by increasing the thickness of the window will correspondingly increase the amount of energy absorption in the device, thereby negating any possible benefit.

As shown in FIG. 3, the preferred embodiment of the present invention comprises a novel combination of beam manipulation, window and cooled mirror technologies. Window 30 incorporates a long, narrow window in an efficient edge cooled configuration to combine the stability and low distortion of a solid window material with the long term continuous operation of an aerowindow. In addition, it offers a robust, fail-safe level of reliability far beyond that required of current and envisioned systems. By configuring the HEL beam with a substantially elongated power distribution in the vicinity of the window, the cooled perimeter length can be increased indefinitely and the conductive path can be further shortened to reduce heating. Current window concepts cannot be used for the next generation of HEL systems which require continuous operation under load. The present window will not only survive the HEL load but will do so with performance comparable to that of a normal cooled mirror.

Window 30 comprises an array of 10 diamond plates 32 as transmission elements, located between base members 34 and 36 along an axis 38. The elements are affixed to the base members by conventional techniques, such as by brazing or compression fitting, which ensures that a high vacuum can be maintained within an enclosure bounded by the present window. Each element has a side surface 40 with an optical polish thereon, yielding a gap between adjacent elements of less than one micron. The window elements are preferably diamond and combine to form an optically continuous clear aperture. The window transmission elements need not be in perfect alignment in that they may be tilted or otherwise slightly rotated about axes perpendicular to axis 38. Such a rotational misalignment will only cause changes in absorption or refraction of a negligible magnitude in a transmitting beam. A list of important operating parameters for several alternative window element materials is shown in Table 1.

The base members can be of any suitable material including copper, molybdenum and silicon carbide. As detailed hereinafter, each base member comprises a heat exchanger, such as channels 42 and 44 for receiving water or liquid ammonia coolant. The outer edges 46 and 48 of each window transmission element are preferably configured in the base members to contact the coolant directly to aid in heat transfer. As noted above, increasing the area of the peripheral surface of the window transmission elements by increasing the thickness thereof will usually increase the amount of energy absorption in the device, thereby negating any possible benefit. To minimize cost and thermal distortion, the preferred diamond plates are selected to be only as thick as is necessary to avoid damage when illuminated. The window transmission elements each have dimensions of 5 mm×4 mm×0.5 mm. Note that in certain applications it may be desirable to provide a flow of a suitable fluid such as air, over a surface of the window elements to keep the surface(s) free of dust and contamination.

A CW beam of radiation 50 is output from high energy laser 52. A linear beam 53 can be created from the laser beam 50 with known optical elements, including beam expansion and collimating elements 54 and cylindrical lens 56. The linear beam is presented to the window transmission elements at a front surface 58 thereof. Alternatively, a spherical lens or mirror can be used to create the linear beam. A system having a spherical lens has an advantage in that fewer components are required. The manner in which a spherical lens is configured to create a linear beam is known, and can be found in a number of optics texts including Jenkins and White, "Fundamentals of Optics", 4th Edition, McGraw Hill Publishing 1976, the relevant portions thereof are incorporated herein by reference. The beam is characterized by a power density which is symmetric about the axis 38 and extends therealong. In the worst case the beam is assumed to be infinitely narrow, with the energy of the beam passing through the window transmission elements entirely along axis 38.

The present invention solves the thermal conductivity problem by utilizing a narrow strip window at or near a line focus in the beam. The geometry of the window is chosen such that its conductive impedance is relatively low. This allows any absorbed energy to be efficiently and rapidly transported to the adjacent heat exchanger (within the edge mounts) before serious heating can occur. With proper design, the concept will operate continuously and with very little distortion.

Unlike a circular window, it can be theoretically be scaled up to unlimited power levels.

As an example, assume that 1% of a 1 MW beam is absorbed and is distributed along an axis 38 of the window having dimensions of 4 cm in length, 0.6 cm in width and 0.1 cm in thickness. The heat flow is essentially bidirectional out from the center of the window elements over a distance (l) of 0.3 cm. The heat flow is described above by equation 2, the well known one dimensional heat flow equation:

$$\Delta T = \frac{Q_a W/2}{2Ltk} \quad (2)$$

where $\dot{Q}_a$ is the absorbed energy, W and L are the width and length, respectively, and K is the thermal conductivity.

$$\Delta T = (10{,}000 \text{ w})(0.6 \text{ cm}/2)/[2(4 \text{ cm})(20 \text{ w/cm/}°\text{C.})] = 188° \text{ C.} \quad (3)$$

This temperature is well within the practical operating range of commercially available diamond. The thermally induced optical distortion is given by:

$$OPD = \cos(\theta) t [dn/dT + CTE(n-1)] \Delta T \quad (4)$$

where OPD is the peak to valley distortion, $\theta$ is the incident angle of the HEL beam with respect to the window, t is the window thickness, n and dn/dT are the refractive index and its variation with temperature, and $\Delta T$ is the temperature difference across the clear aperture. For a beam incident at normal angles to the above diamond window, with material parameters of 10 ppm, 1 ppm and 2.3 for dn/dT, CTE and n, respectively, the distortion range is 0.21 micrometer. Since a proper window design necessitates a window width which is nominally 2–3 times larger than the beam, the beam transits a region which incurs only 30–50% of the temperature drop. Thus the actual range is closer to 0.1 micrometer. This peak to valley value is comparable to that achieved with high quality cooled HEL mirrors.

Windows of the present type can be used to directly receive the laser beam or to prevent contamination or contact with the environment. Another use of the present window includes an aperture sharing element, oriented for example at the Brewster angle to receive narrow or broadband wavelength beams. A sapphire or BeO strip window can be oriented at the Brewster angle to the axis of a converging HEL beam. Operation at the Brewster's angle enables the elimination of coating concerns, and with normal surface losses being comparable to that of the bulk material, the elimination of optical coating losses can typically reduce the total absorbed energy by a factor of 70% or more. In addition, the damage threshold from pulsed laser beams improves for windows with no optical coatings. Other applications include a transparent bulk medium suitable for the three and four wave mixing needed for nonlinear and conjugate optic schemes.

To minimize the temperature rise in the window elements, it is necessary to maximize the thermal conductivity of the material such as by selection of the proper window element material such as the diamond elements of the preferred embodiment. Other window materials including sapphire, berillium oxide (BeO), and other equivalent material may be substituted where suitable. An additional advantage of using diamond is it's enormous thermal resiliency. Unlike other transmissive materials, diamond is essentially fail-safe under HEL loading. Diamond windows have withstood 10.6 $\mu$m laser intensities well in excess of 10 Mw/cm$^2$ and a cw damage limit above 1000 Mw/cm$^2$ has been hypothesized.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. A window for transmitting radiation distributed over an axis, comprising:
   a transmission element means having a width, a length and outer peripheral surfaces, said transmission element means receiving and transmitting said radiation with a portion of the energy thereof absorbed by said transmission element means; and
   first and second base members adapted to receive said transmission element means along opposed ones of the peripheral surfaces which are parallel to said axis; said first and second members locating said transmission element means such that said axis is centrally positioned along the length of said transmission element means and dissipating said absorbed energy portion; said transmission element means having a length to width ratio substantially greater than one such that substantially all of said energy portion is transferred to said first and second base members.

2. The window of claim 1, wherein said first and second base members further comprise heat exchanger means configured therein adapted to receive flowing coolant.

3. The window of claim 1, wherein said transmission element means comprises a material selected from the group consisting essentially of diamond, beryllium oxide (BeO), aluminum oxide and silicon.

4. The window of claim 1, wherein said transmission element means is oriented at Brewster's angle with respect to the radiation presented thereto.

5. The window of claim 1, wherein said transmission element means comprises a plurality of plates configured along said axis, with each plate having a side surface extending between said members adapted to receive an adjacent one of said plates.

6. The window of claim 5, wherein said plate side surfaces are optically flat.

7. The window of claim 1, wherein said transmission element means has a length to width ratio of approximately 10:1.

8. The window of claim 1, wherein said transmission element means opposed surfaces are recessed in said first and second base members.

9. The window of claim 1, wherein said transmission element means has a length to width ratio of approximately 2:1.

10. A window for transmitting radiation distributed over an axis, comprising:
    a transmission element means having a width, a length and outer peripheral surfaces, said transmission element means receiving and transmitting said radiation with a portion of the energy thereof absorbed by said transmission element means; and
    first and second base members comprising a material selected from the group consisting essentially of molybdenum, silicon carbide and copper adapted to receive said transmission element means along opposed surfaces of the peripheral surfaces which are parallel to said axis; said first and second members locating said transmission element means such that said axis is centrally positioned along the length of said transmission element means and dissipating said absorbed energy portion; said transmission element means width and length having a ratio such that substantially all of said energy portion is transferred to said first and second base members.

11. A system for providing a high energy beam of radiation, said system comprising:

a radiation source means for generating a beam of high energy radiation;

a lens means for receiving said beam and for focusing said beam such that a beam energy density extends along an axis;

a window for transmitting said focused beam including;

a transmission element means having a width, a length and outer peripheral surfaces, said transmission element means receiving and transmitting said radiation with a portion of the energy thereof absorbed by said transmission element means; and first and second base members adapted to receive said transmission element means along opposed ones of the peripheral surfaces which are parallel to said axis; said first and second members locating said transmission element means such that said axis is centrally positioned along the length of said transmission element means and dissipating said absorbed energy portion;

said transmission element means having a length to width ratio such that substantially all of said energy portion is transferred to said first and second base members.

12. The window of claim 11, wherein said first and second base members further comprise heat exchanger means configured therein adapted to receive flowing coolant.

13. The window of claim 11, wherein said first and base second members comprise a material selected from the group consisting essentially of molybdenum, silicon carbide and copper.

14. The window of claim 11, wherein said transmission element means comprises a material selected from the group consisting essentially of diamond, beryllium oxide (BeO), aluminum oxide and silicon.

15. The window of claim 11, wherein said transmission element means is oriented at Brewster's angle with respect to the radiation presented thereto.

16. The window of claim 11, wherein said transmission element means comprises a plurality of plates configured along said axis, with each plate having a side surface extending between said members adapted to receive an adjacent one of said plates.

17. The window of claim 16, wherein said plate side surfaces are optically flat.

18. The window of claim 11, wherein said transmission element means has a length to width ratio of approximately 10:1.

19. The window of claim 11, wherein said transmission element means opposed surfaces are recessed in said first and second base members.

* * * * *